UNITED STATES PATENT OFFICE.

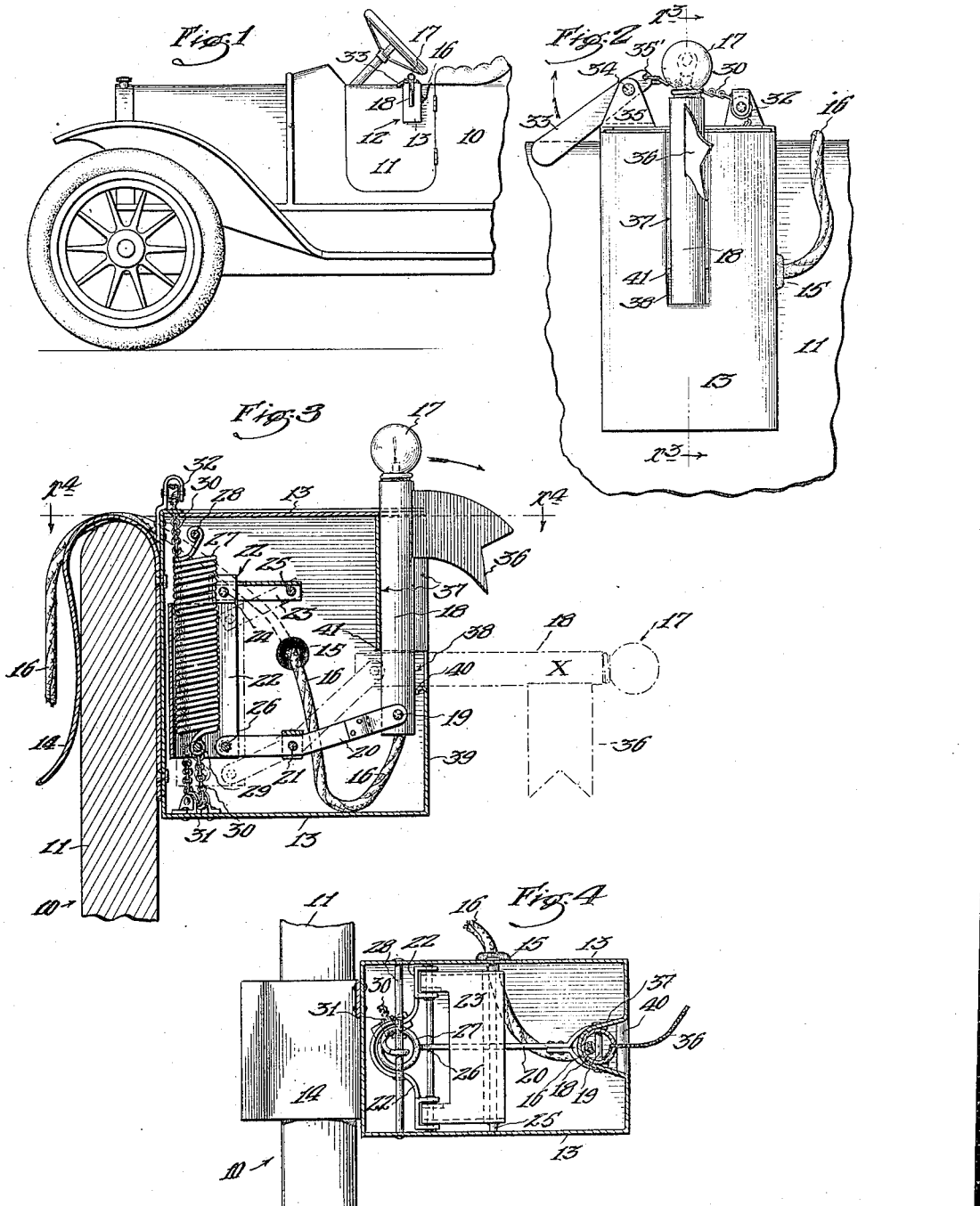

ELIJAH W. BRYAN, OF LOS ANGELES, CALIFORNIA.

AUTOMOBILE-SIGNAL.

1,194,596.   Specification of Letters Patent.   Patented Aug. 15, 1916.

Application filed November 14, 1914. Serial No. 872,265.

*To all whom it may concern:*

Be it known that I, ELIJAH W. BRYAN, a citizen of the United States, residing at Los Angeles, in the county of Los Angeles and State of California, have invented a new and useful Automobile-Signal, of which the following is a specification.

My invention relates to automobile or other vehicle signals.

In the practical handling of any vehicle, and particularly in the handling of automobiles or other vehicles on city streets, it is desirable to be able to indicate to following vehicles or other traffic any intention to turn from a straight path, and particularly any intention to swing across the highway as is necessary in turning into cross streets. It is the present practice for automobile drivers to hold out an arm to indicate an intention to turn and in most cities the ordinances require that the signal shall be given in this manner. Holding out an arm, is, however, objectionable as it necessitates steering the automobile and manipulating the control thereof with one hand, which is often hazardous.

The principal object of my invention is to provide a mechanical signal which may be set instantly and which will serve as a substitute for holding out of the arm.

The ordinary arm signal is further objectionable in that it is difficult to see on a dark night, at which time it is most essential, and a further object of the invention is to provide means for illuminating the mechanical signal so that it is visible on a dark night.

A further object of the invention is to provide a signal which can be easily attached to and detached from existing automobiles without the necessity for drilling or other marring of the automobile to which it is attached.

Other objects and advantages will be made evident hereafter, or will be evident to one skilled in the art from a perusal of the following specification and an examination of the annexed drawing.

Referring to the drawings, which show one embodiment of my invention, and which are presented for illustrative purposes only: Figure 1 is an elevation of a portion of an automobile equipped with my invention. Fig. 2 is an enlarged view of my invention as applied to an automobile. Fig. 3 is a section on the plane $x^3$—$x^3$ of Fig. 2. Fig. 4 is a section on the plane $x^4$—$x^4$ of Fig. 3.

In these drawings, an automobile 10 is shown which is equipped with a door 11 which may be of any standard form. The signal 12 consists of a case 13 having a spring finger 14 attached thereto by which the signal may be hung on the door 11. An insulating bushing 15 is provided in the side of the signal through which flexible conductors 16 may be passed for the purpose of supplying electric current to a lamp 17 which is carried on the end of an arm 18. The arm 18 is pivoted at 19 to a lever 20, the lever being pivoted at 21 in the case 13. A movable frame 22 is provided, being carried on a link 23, which is pivoted to the frame 22 at 24 and which is pivoted to the case 13 at 25. The lever 20 is pivoted at 26 to the frame 22. A tension spring 27 is secured at 28 to the case 13 and is attached to a pin 29 which is fixed in the movable frame 22. A chain 30 is also secured to the pin 29, passing downwardly over a pulley 31 and upwardly and over a pulley 32, the pulleys 31 and 32 being fixed in the case 13. An operating lever 33 is pivoted at 34 in a bearing 35 which is fixed to the case 13, and the chain 30 is secured at 35' to the lever 33. A display means, such as a flag 36, is also fixed to the arm 18. The arm 18 normally stands in a depression 37 formed in the end of the case 13, the lower portion passing through an opening 38 into the interior of the case. The wall 39 of the case extends upwardly, as shown in Fig. 3, and has a lip 40 formed thereon.

The method of operation of the invention is as follows:—Under normal conditions the parts of the signal are in the position illustrated in the drawings, being held in this position by the action of the spring 27 which holds the movable frame 22 in the position shown in full lines, thereby holding the arm in the position shown in full lines. When the operator of the automobile desires to turn the automobile, he throws the operating lever 33 in the direction shown by the arrow in Fig. 2, thereby pulling upon the chain 30 which turns freely over the pulleys 31 and 32. The pin 29 is thereby pulled downwardly so that the frame 22 assumes the position shown in dotted lines in Fig. 3, the lever 20 being rotated in a counter-clockwise direction into the position shown in dotted lines in that figure. This in turn throws the arm 18 into the horizontal position, as shown at $x$ in Fig. 3, the arm, when in this position, resting on the lip 40 and upon the edge 41 of the depression 37. Whenever it is desired to release the signal, the lever 33 is returned to its original position, thereby allowing the spring 26 to pull the parts into their original position, the arm 18 rotating and sliding on the lip 40. A considerable friction is necessary on the operating lever 33 to insure its holding the signal in the desired position. For this purpose the pin 34 is made to bind on the bearing 35 so that there is considerable friction on the lever 33.

I claim as my invention:—

An automobile signal comprising a case having a hole in one side thereof, said hole having a rounded lip at the lower edge thereof, and said case having a vertical depression formed in the side thereof above said hole, an arm normally partially concealed in said depression, a display attached to said arm, and means for swinging said arm out of said depression and for rocking said arm over said rounded lip to throw said display back into said depression.

In testimony whereof, I have hereunto set my hand at Los Angeles, California, this 9th day of November, 1914.

ELIJAH W. BRYAN.

In presence of—
 FRED A. MANSFIELD,
 FORD W. HAINS.

Copies of this patent may be obtained for five cents each, by addressing the "Commissioner of Patents, Washington, D. C."